June 14, 1960    F. J. KENNEY ET AL    2,940,379
FOOD WARMING ATTACHMENT FOR ELECTRIC TOASTERS
Filed Nov. 26, 1958
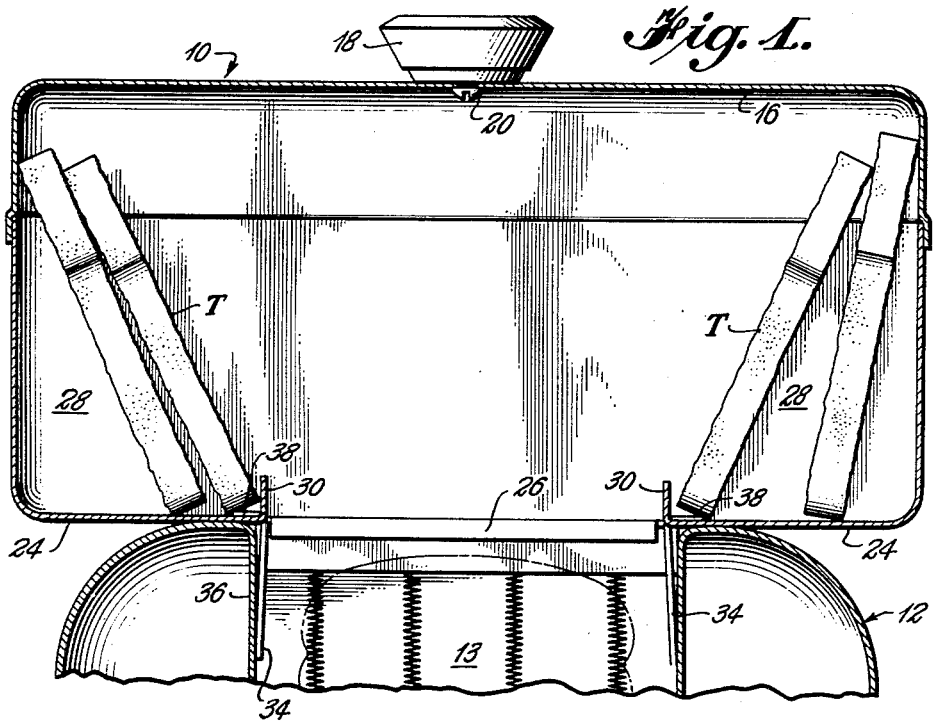
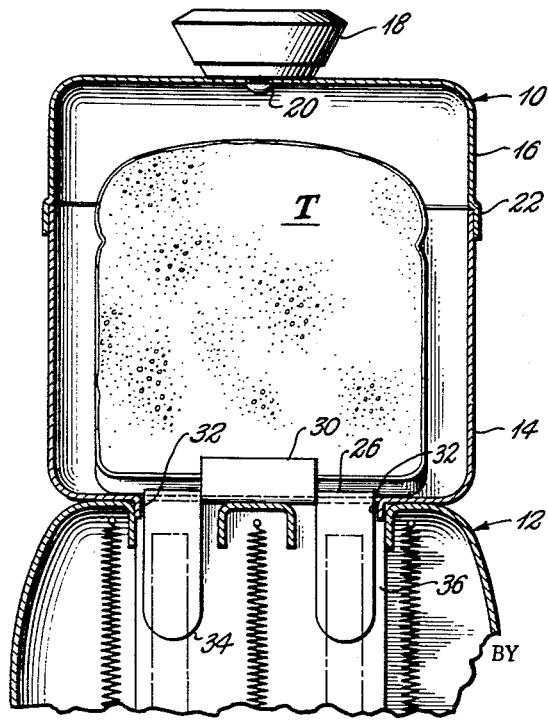
INVENTOR
*Francis J. Kenney and
John F. Kenney*
BY *Slighrue and Rothwell*
ATTORNEYS United States Patent Office 2,940,379
Patented June 14, 1960

2,940,379

FOOD WARMING ATTACHMENT FOR ELECTRIC TOASTERS

Francis J. Kenney and John F. Kenney, both of 57 Vancouver St., Boston, Mass.

Filed Nov. 26, 1958, Ser. No. 776,508

3 Claims. (Cl. 99—339)

This invention relates to improvements in a food warming attachment adapted to be secured to the top of an electric toaster to utilize the heat produced therein for heating articles of food such as biscuits, muffins, buns, toast, and the like.

This application is a continuation-in-part of applicants' prior application Serial No. 739,342, filed June 2, 1958. In the original application, applicants have disclosed a food warming attachment for an electric toaster of the type adapted to attach by resilient clips to sides of the slots of a top-slotted electric toaster and to provide an enclosed compartment for storing and warming toast or other articles of food by the heat produced in the toaster. The food warming attachment does not in any way hinder the regular production of toast which may be inserted or removed through slots in the bottom thereof. The original application also disclosed a food warming attachment for toasters in which there are storage areas adjacent the ends thereof, and means in the form of a transverse bar for retaining the articles to be warmed within the storage areas while the toaster may be used in its normal function. The attachment of this nature may be affixed to a top-slotted toaster and need not be removed therefrom unless it is desired to clean the attachment or the toaster at periodic intervals.

This application includes many of the desirable features disclosed in the original application and has the additional advantages of providing an improved form of resilient clip to attach the food warmer to the toaster as well as a simplified means for retaining the articles to be warmed in the storage areas.

Accordingly, it is an object of this invention to provide a food warming attachment for toasters having an extremely simple and inexpensive construction which attachment may be mass produced by conventional sheet metal working machinery at a low cost. The construction is simple in that resilient clips having a depending engaging portion secure the attachment to the toaster by frictionally engaging the toaster shell at ends of the toast slots. Also, retaining means are provided for retaining the food to be warmed in storage areas of the toaster attachment by means of an upturned flange or extension on the bottom of the warmer adjacent the opening therein. The construction is further simplified by the provision of only one large opening in the bottom of the toaster attachment which will register with more than one of the toast slots in the toaster.

Other objects and advantages of this invention will be apparent from the following detailed description and claims when taken in connection with the accompanying drawings, which disclose, by way of example, the principles of this invention and the best mode which has been contemplated of applying these principles.

In the drawings:

Fig. 1 is a side sectional elevation view showing the food warming attachment of this invention as applied to a top-slotted electric toaster; and Fig. 2 is an end sectional elevation view showing the toaster attachment of Fig. 1.

Referring to the drawing, a food warming attachment indicated generally by reference numeral 10 is adapted to be secured more or less permanently to a conventional top-slotted electric toaster 12. The warmer 10 includes a generally tray-shaped bottom portion 14 which is adapted to support a cover 16 having a handle 18 secured thereto by suitable screw means 20. A lip 22 may be provided around the periphery of the cover 16 for determining the extent to which the cover will telescope the tray 14.

The tray 14 includes a bottom wall 24 having a relatively large rectangular opening 26 near the center thereof. This opening is adapted to overlie both of the slots of a two-slotted electric toaster, hence the heated air produced by the toaster will rise therethrough and pass into the enclosed food warming attachment 10.

The areas within the enclosed food warmer 10 which are not directly above the opening 26 in the bottom thereof may be defined as the food storage areas 28. This invention includes improved means for retaining the food to be warmed in these storage areas. As shown in Fig. 1, slices of toast T or other suitable articles of food may be retained within the food storage areas 28 by means of flanges 30 extending upwardly from the bottom 24 adjacent the ends of opening 26. By making the upstanding flanges integral with the bottom 26 or a simple attachment thereto, substantial expenses of fabrication can be saved.

The sides of the opening 26 may include downturned flanges 32 to aid in preventing any hot air rising from the toaster 12 from leaking to ambient and not going into the warmer 10.

The warmer attachment 10 is secured to the top-slotted toaster 12 by an improved resilient clip means. This clip means includes depending tongues 34 of resilient material positioned at the ends of opening 26 to overlie the ends of the slots in the toaster 12. These tongues 34 normally extend slightly outward toward the ends of the toaster attachment such that when the attachment 10 is positioned on the toaster 12 the tongues 34 will frictionally engage the toaster shell 36 at the ends of the slots therein. The resilient clips which are constructed of a resilient material may be separate pieces which are attached to the bottom 24 of the tray 14 by spot welding or the like at an attachment flange 38 thereon.

Although the operation of the food warming attachment is believed to be evident from the foregoing description, a brief summary of the operation will now be described. The attachment 10 may be secured to a conventional toaster 12 by pushing the ends of the resilient tongues 34 toward each other and positioning these tongues at the ends of the toaster slots. Then the assembly may be pushed down into the toaster and the tongues 34 will frictionally engage the toaster shell 36 at the ends of the slots and will securely hold the warmer attachment 10 on the toaster 12. After the attachment 10 is secured on top of the toaster 12 it may remain thereon except for periodic cleaning intervals as the attachment 10 in no way interferes with normal operation of the toaster. The cover 16 may be removed by grasping the handle 18 and bread B may be inserted through opening 26 for toasting in a normal manner. The bread B after being toasted or any other bakery goods or the like may be inserted in the food storage areas 28 to receive the heat which will be distributed therein by air conduction from the heat produced in the toaster 12. Since the resilient clips 34 are positioned at the ends of the toaster slots to bear on the toaster shell 36, they will in no way interfere with the heating elements of the toaster and the operation of the toaster is not impeded in any manner by this attachment.

While there has been shown and described the fundamental novel features of the invention as applied to the preferred embodiment, it will be understood that various omissions and substitutions and changes in the form and details of the device illustrated and its operation may be made by those skilled in the art without departing from the spirit of the invention. It is the intention, therefore, to be limited only as indicated by the scope of the following claims and reasonable equivalents thereof.

What is claimed is:

1. A food warming attachment adapted to be secured to a top-slotted electric toaster, said attachment comprising; a generally enclosed container having an opening in its bottom wall adapted to register with the bread-receiving top slots in an electric toaster, the bottom wall of said enclosed container extending substantially beyond the ends of said opening therein to form a storage portion within said enclosed container, whereby articles of food may be stored therein to receive heat produced by said toaster without interfering with the normal operation of the toaster, flanges extending upwardly from the bottom wall of said container adjacent the ends of said opening therein, said flanges adapted to retain articles of food within said storage areas and prevent them from entering the opening in the bottom wall of said enclosed container, and resilient clip means extending downwardly from the bottom of said enclosed container at the ends of the opening therein to frictionally engage the shell of the toaster at the ends of the slots therein to retain the attachment on the top of the toaster without in any way hindering normal operation of the toaster.

2. A device as defined in claim 1 wherein said resilient means include resilient tongues depending from said warming attachment and extending outwardly toward the ends thereto.

3. A food warming attachment adapted to be secured to a conventional electric toaster of the type having top slots for receiving bread to be toasted and shell-defining end walls in said slots, said attachmment comprising; an enclosed container having a removable cover, means defining at least one elongated opening in the bottom wall of said container, said opening being of sufficient size to overlie the slots of said electric toaster, the bottom wall of said enclosed container extending a distance beyond the edges of said opening to define food storage and warming areas structural means attached to the inside of the enclosed container and positioned adjacent the ends of said opening in the bottom wall of the container for retaining articles of food in said food storage and warming areas, and resilient clip means including depending resilient tongues extending downwardly from said opening at the ends thereof, said tongues adapted to be positioned adjacent the ends of each toaster slot, said resilient tongues being normally biased to frictionally engage the toaster shell at the ends of each toast slot therein to frictionally hold the attachment on said toaster without interfering with the normal toasting function of the toaster, when said attachment is secured to a toaster.

References Cited in the file of this patent

UNITED STATES PATENTS

| | | |
|---|---|---|
| 861,007 | Wilhelm | July 23, 1907 |
| 1,709,537 | Owen | Apr. 16, 1929 |
| 2,521,855 | Kodadek | Sept. 12, 1950 |
| 2,851,943 | Smagula | Sept. 16, 1958 |